(12) United States Patent
Uchino et al.

(10) Patent No.: US 8,877,303 B2
(45) Date of Patent: Nov. 4, 2014

(54) LIQUID CRYSTAL DISPLAY DEVICE AND ALIGNMENT FILM MATERIAL THEREOF

(75) Inventors: Shoichi Uchino, Mobara (JP); Noboru Kunimatsu, Chiba (JP)

(73) Assignee: Japan Display Inc., Tokyo (JP)

( * ) Notice: Subject to any disclaimer, the term of this patent is extended or adjusted under 35 U.S.C. 154(b) by 84 days.

(21) Appl. No.: 13/467,093

(22) Filed: May 9, 2012

(65) Prior Publication Data

US 2012/0300162 A1 Nov. 29, 2012

(30) Foreign Application Priority Data

May 23, 2011 (JP) ................................ 2011-114470

(51) Int. Cl.
*G02F 1/1337* (2006.01)
*C09K 19/56* (2006.01)

(52) U.S. Cl.
CPC ................................ *G02F 1/133788* (2013.01)
USPC ....... 428/1.2; 428/1.25; 428/1.26; 252/299.4; 349/123; 349/128; 349/129

(58) Field of Classification Search
USPC ............... 428/1.1, 1.2, 1.25, 12.6; 252/299.4; 349/123, 128, 129
See application file for complete search history.

(56) References Cited

U.S. PATENT DOCUMENTS

| | | |
|---|---|---|
| 5,783,656 A * | 7/1998 | Kimura et al. ................. 528/353 |
| 2003/0025864 A1 | 2/2003 | Chida et al. |
| 2006/0142538 A1 | 6/2006 | Tsutsui et al. |

FOREIGN PATENT DOCUMENTS

| | | |
|---|---|---|
| CN | 1720478 A | 1/2006 |
| JP | 09-272740 | 10/1997 |
| JP | 2001-294663 | 10/2001 |
| JP | 2004-20658 | 1/2004 |
| JP | 2004-86047 | 3/2004 |
| JP | 2004-163646 | 6/2004 |
| JP | 2004-341030 | 12/2004 |
| JP | 2004-346311 | 12/2004 |
| JP | 2005-215029 | 8/2005 |
| JP | 2006-17880 | 1/2006 |
| WO | WO 2010/092989 | 8/2010 |

OTHER PUBLICATIONS

Office Action in corresponding European Patent Application No. 12167566.4, dated Oct. 8, 2013.
English translation of CN office action of Appln. No. 201210163618.0 dated May 28, 2014.

* cited by examiner

*Primary Examiner* — Shean C Wu
(74) *Attorney, Agent, or Firm* — Antonelli, Terry, Stout & Kraus, LLP.

(57) ABSTRACT

To form an optical alignment film having large anchoring strength and suppress an AC afterimage of a liquid crystal display device, in a liquid crystal display device of an IPS mode. In an alignment film material subjected to optical alignment processing, polyimide which becomes a rigid high molecule and polyimide which becomes a flexible high molecule are mixed and used. The material of the present invention can easily rotate oligomer after irradiating polarized ultraviolet rays and improve a UV-absorbed two-color ratio of an alignment film. Accordingly, an anchoring strength for liquid crystals by the alignment film is large to suppress an AC afterimage.

12 Claims, 4 Drawing Sheets

LIQUID CRYSTAL DISPLAY DEVICE AND ALIGNMENT FILM MATERIAL THEREOF

CLAIM OF PRIORITY

The present application claims priority from Japanese Patent Application JP 2011-114470 filed on May 23, 2011, the content of which is hereby incorporated by reference into this application.

FIELD OF THE INVENTION

The present invention relates to a liquid crystal display device, and more particularly, to a liquid crystal display device that grants an alignment control capability by irradiating light to an alignment film.

BACKGROUND OF THE INVENTION

In a liquid crystal display device, a TFT substrate in which a pixel electrode and a thin film transistor (TFT) are formed in matrices and an opposed substrate where a color filter is formed at a place corresponding to the pixel electrode of the TFT substrate is installed to be opposed to the TFT substrate, and liquid crystals are interposed between the TFT substrate and the opposed substrate. An image is formed by controlling light transmittance by liquid crystal molecules for each pixel.

Since the liquid crystal display device has a flat shape and a light weight, the use of the liquid crystal display device has been widened to various fields such as a large-sized display device such as a TV, a cellular phone, or a digital still camera (DSC). Meanwhile, a viewing angle characteristic is problematic in a liquid crystal display device. The viewing angle characteristic is a phenomenon in which luminance is changed or chromaticity is changed when a screen is viewed from the front side and when the screen is viewed from an inclined direction. An in plane switching (IPS) mode in which the liquid crystal molecules are operated by horizontal electric fields has an excellent viewing angle characteristic.

As a method of performing alignment processing of an alignment film used in the liquid crystal display device, that is, granting an alignment control capability, a method of processing by rubbing as the related art is used. In the alignment processing by the rubbing, the alignment processing is performed by rubbing the alignment film with a cloth, but meanwhile, there is an optical alignment method of granting the alignment control capability by non-contact with the alignment film. Since the IPS mode does not need a pretilt angle, the optical alignment method can be applied. Japanese Patent Application Laid-Open Nos. 2004-86047, 2004-20658, 2004-163646, 2004-341030, 2004-346311, 2005-215029, and 2006-17880 are known examples associated with the optical alignment film and they disclose that a cross-linking reaction, a cleavage reaction, or a dimerization reaction of the molecules is caused within a thin film by irradiating linearly polarized ultraviolet rays and anisotropy is granted to an arrangement of the molecules within the thin film.

SUMMARY OF THE INVENTION

In optical alignment processing in the related art, image burn called an AC afterimage occurs more easily as compared with rubbing. The AC afterimage is an afterimage generated because an initial alignment direction is deviated from a direction at the time of first manufacturing of the liquid crystal display device when the liquid crystal display device operates over a long time. The AC afterimage is irreversible and irrecoverable.

The AC afterimage can be improved by (1) improvement of alignment orderliness of an alignment film, (2) improvement of mechanical strength using modulus of elasticity and hardness of the alignment film as parameters, and (3) improvement of affinity between the alignment film and liquid crystals. Among them, improvement of alignment orderliness of the alignment film is particularly effective in reducing the AC afterimage.

However, in the optical alignment method, the effective method for improving the alignment orderliness has not been discovered. The present invention has been made in an effort to improve the alignment orderliness of the alignment film and suppress generation of the AC afterimage in optical alignment processing.

The present invention has been made in an effort to provide a liquid crystal display device and detailed means is as follows. That is, an embodiment of the present invention provides a liquid crystal display device, including: a TFT substrate where an alignment film is formed on a pixel having a pixel electrode and a TFT; an opposed substrate opposed to the TFT substrate and where an alignment film is formed on a color filter; and liquid crystals interposed between the alignment film of the TFT substrate and the alignment film of the opposed substrate, wherein the alignment films are subjected to optical alignment processing, and the alignment films use an alignment material (having a flexible structure) acquired by esterifying the dehydrated condensate of material represented by (Chem. 1) (1,2-bis(4-aminophenyl)ethane when R1 and R2 are hydrogen and n=2) and material represented by (Chem. 3) (1,3-dimethyl cyclobutane tetracarboxylic acid dianhydride when R3 and R4 are methyl) and an alignment material (having a rigid structure) acquired by esterifying the dehydrated condensate of material represented by (Chem. 2) (paraphenyldiamine) and material represented by (Chem. 3) (1,3-dimethyl cyclobutane tetracarboxylic acid dianhydride when R3 and R4 are methyl).

wt % with respect to the entire flexible structure is more than 0 wt % and 80 wt % or less and more preferably, 60 wt % or more or 80 wt % or less.

According to embodiments of the present invention, since an order parameter (OP) can be increased and an anchoring strength can be increased in an optical alignment film, a liquid crystal display device having the optical alignment film suppressing an AC afterimage can be implemented.

DETAILED DESCRIPTION OF THE EMBODIMENTS

Figure 1:
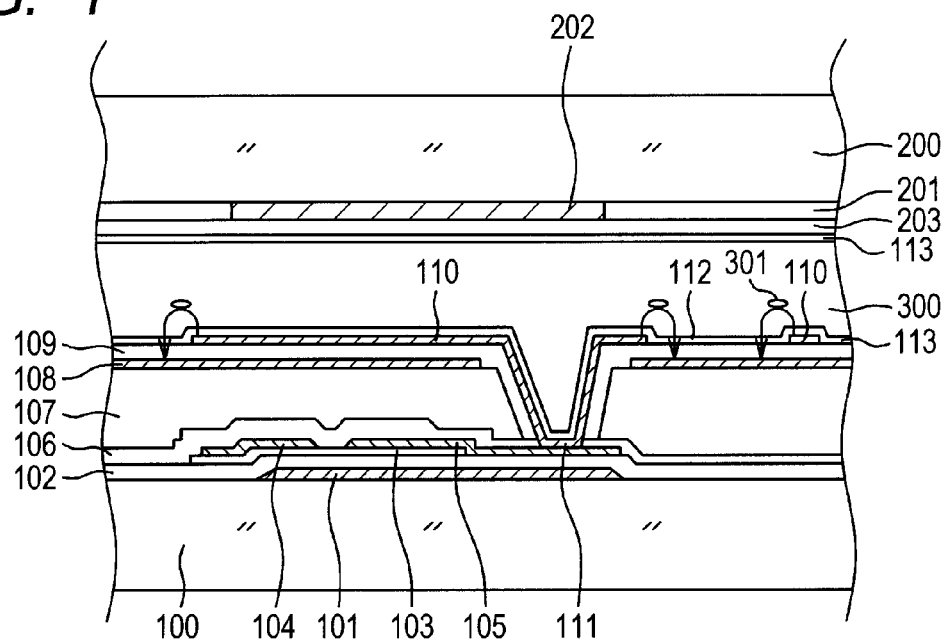
FIG. 1 is a cross-sectional view of a liquid crystal display device of an IPS mode.

Prior to describing an embodiment of the present invention, a structure of a liquid crystal display device of an IPS mode to which the present invention is applied will be described. FIG. 1 is a cross-sectional view illustrating a structure in a display area of a liquid crystal display device of an IPS mode. Various electrode structures of the liquid crystal display device of an IPS mode are proposed and commercialized. The structure of FIG. 1 is a structure which is widely used at present, and in brief, a comb-shaped pixel electrode 110 is formed by inserting an insulating film on an opposed electrode 108 formed as a plane. In addition, an image is formed by controlling light transmission of a liquid crystal layer 300 for each pixel by rotating a liquid crystal molecule 301 with a voltage between the pixel electrode 110 and the opposed electrode 108. Hereinafter, the structure of FIG. 1 will be described in detail. Further, a configuration of FIG. 1 is described as an example, but the present invention may also be applied to a liquid crystal display device of an IPS type other than FIG. 1.

In FIG. 1, a gate electrode 101 is formed on a TFT substrate 100 made of glass. The gate electrode 101 is formed on the same layer as a scanning line. In the gate electrode 101, a MoCr alloy is laminated on an AlNd alloy.

A gate insulating layer 102 made of SiN covers the gate electrode 101. A semiconductor layer 103 is formed by an a-Si layer at a position on the gate insulating layer 102 opposed to the gate electrode 101. The a-Si layer is formed by plasma CVD. The a-Si layer forms a channel part of a TFT, and a source electrode 104 and a drain electrode 105 are formed on the a-Si layer with the channel part interposed therebetween. Further, an n+Si layer (not shown) is formed between the a-Si layer and the source electrode 104 or the drain electrode 105. The reason is that the semiconductor layer and the source electrode 104 or the drain electrode 105 ohmic-contact each other.

The source electrode serves as an image signal line and the drain electrode 105 is connected with the pixel electrode 110. Both the source electrode 104 and the drain electrode 105 are formed on the same layer simultaneously. In the embodiment, the source electrode 104 or the drain electrode 105 is made of the MoCr alloy. When electrical resistance of the source electrode 104 or the drain electrode 105 is to be reduced, for example, an electrode structure in which the AlNd alloy is sandwiched with the MoCr alloy is used.

An inorganic passivation layer 106 made of SiN covers the TFT. The inorganic passivation layer 106 protects, in particular, the channel part of the TFT from impurities 401. An organic passivation layer 107 is formed on the inorganic passivation layer 106. The organic passivation layer 107 serves to protect the TFT and planarize the surface and thus is formed to be thick. The thickness thereof is in the range of 1 µm to 4 µm.

In the organic passivation layer 107, a photosensitive acrylic resin, a silicon resin, or a polyimide resin is used. A through-hole 111 needs to be formed at a portion on the organic passivation layer 107 where the pixel electrode 110 and the drain electrode 105 are connected with each other; since the organic passivation layer 107 is photosensitive, the through-hole 111 may be formed by exposing and developing the organic passivation layer 107 itself without using photoresist.

The opposed electrode 108 is formed on the organic passivation layer 107. The opposed electrode 108 is formed by sputtering indium tin oxide (ITO) which is a transparent conductive layer to an entire display area. That is, the opposed electrode 108 has a planar shape. After the opposed electrode 108 is formed on the entire area by sputtering, only the through-hole 111 for conducting the pixel electrode 110 and the drain electrode 105 is removed by etching the opposed electrode 108.

An upper insulating layer 109 made of SiN covers the opposed electrode 108. After the upper insulating layer 109 is formed, the through-hole 111 is formed by etching. The through-hole 111 is formed by etching the inorganic passivation layer 106 by the upper insulating layer 109 as resist. Thereafter, the ITO forming the pixel electrode 110 is formed by sputtering by covering the upper insulating layer 109 and the through-hole 111. The pixel electrode 110 is formed by patterning the sputtered ITO. The ITO forming the pixel electrode 110 is deposited even on the through-hole 111. In the through-hole 111, the drain electrode 105 and the pixel electrode 110 that extend from the TFT are conducted to each other and an image signal is supplied to the pixel electrode 110.

Figure 2:
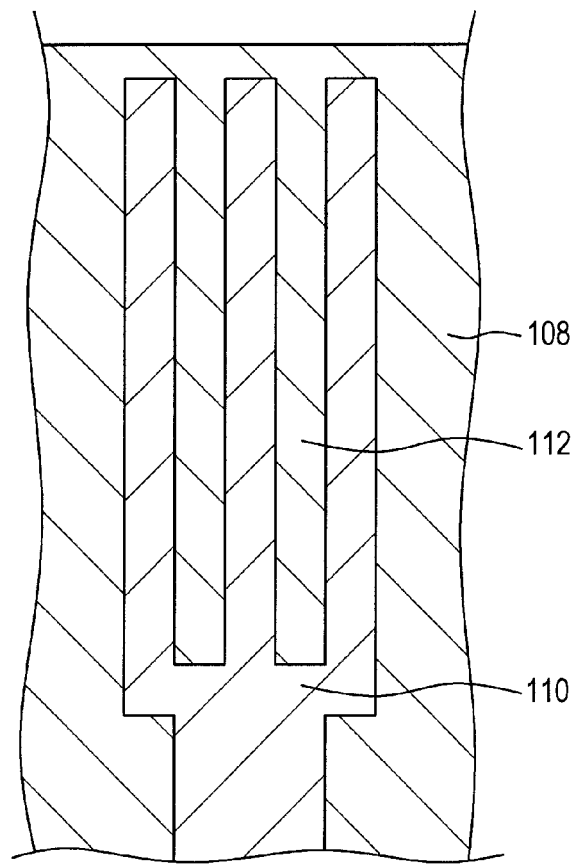
FIG. 2 is a plan view of a pixel electrode of FIG. 1.

One example of the pixel electrode 100 is illustrated in FIG. 2. The pixel electrode 110 is a comb-shaped electrode. A slit 112 is formed between combs. The planar opposed electrode 108 is formed below (downward) the pixel electrode 110. When the image signal is applied to the pixel electrode 110, a liquid crystal molecule 301 is rotated by an electric force line generated between the opposed electrodes 108 through the slit 112. As a result, the image is formed by controlling light passing through a liquid crystal layer 300.

FIG. 1 describes this aspect as the cross-sectional view. The slit 112 shown in FIG. 1 is formed between the comb-shaped electrode and the comb-shaped electrode. A predetermined voltage is applied to the opposed electrode 108 and a voltage by the image signal is applied to the pixel electrode 110. When the voltage is applied to the pixel electrode 110, the electrical force line is generated to rotate the liquid crystal molecule 301 in the direction of the electrical force line, thereby controlling transmission of light from a backlight, as shown in FIG. 1. Since the transmission from the backlight is controlled for each pixel, the image is formed.

In the example of FIG. 1, the opposed electrode 108 having the planar shape is disposed on the organic passivation layer 107 and the comb-shaped electrode 110 is disposed on the upper insulating layer 109. Contrary to this, however, the pixel electrode 110 having the planar shape may be disposed on the organic passivation layer 107 and the comb-shaped opposed electrode 108 may be disposed on the upper insulating layer 109. An alignment film 113 for aligning the liquid crystal molecules 301 is formed on the pixel electrode 110. The alignment film 113 is subjected to the optical alignment processing.

In FIG. 1, an opposed substrate 200 is installed with the liquid crystal layer 300 interposed between the substrates. A color filter 201 is formed inside the opposed substrate 200. Red, green, and blue color filters 201 are formed for each pixel, and a color image is formed. Black matrices 202 are formed between the color filters 201 to improve a contrast of the image. Further, the black matrices 202 also serve as a light shielding layer of the TFT and prevent optical current from flowing on the TFT.

An overcoat layer 203 is formed by covering the color filter 201 and the black matrices 202. Since the surfaces of the color filter 201 and the black matrices 202 are uneven, the surfaces are planarized by the overcoat layer 203. The alignment film 113 for determining initial alignment of the liquid crystals is formed on the overcoat layer 203. The alignment film 113 is subjected to the optical alignment processing as well.

In the present invention, an AC afterimage is reduced by improving alignment orderliness of the optical alignment film in FIG. 1. The inventors theoretically have analyzed the relationship among physical values such as a molecular extinction coefficient and a photolytic quantum yield in an alignment film material and process parameters (heating temperature, heating time, and an exposure time) and the alignment orderliness. They have revealed that a molecular extinction coefficient ratio between an axial direction and a short-axis direction of molecules of the alignment film material and a change in molecular direction of oligomer generated by photolysis of polyimide by polarization exposure play an important role in improving the alignment orderliness. Herein, the molecular extinction coefficient ratio is ∈p/∈v, ∈p is a molecular extinction ratio of a long-axis direction of the molecules of polyimide, and ∈v is a molecular extinction ratio of a short-axis direction of the molecules of polyimide.

As the molecular extinction coefficient ratio between the long-axis direction of the molecules and the short-axis direction of the molecules increases, a difference in density of polyimide between a parallel direction and an orthogonal direction to an electric field vector by polarization exposure increases, and as a result, the alignment film having the high alignment orderliness may be formed. In general, polyimide having a large molecular extinction coefficient ratio between the long-axis direction of the molecules and the short-axis direction of the molecules is a high molecule in which the molecules have high linearity and are rigid.

Meanwhile, the amount of directional change of oligomer is increased as high as polyimide (polyimide with an alkyl chain as a main chain and in which molecule-axis rotation is induced by heating after polarization exposure) having high flexibility. As a result, in order to balance the improvement of the alignment orderliness in the photolysis and the improvement of the alignment orderliness in the polarization exposure, opposite polyimide characteristics require to be offset.

The inventor has discovered that a conflicting relationship between rigidity and flexibility required for the optical alignment film can be offset by mixing (rigid) polyimide having the high molecular extinction coefficient ratio with polyimide having high flexibility and an alignment film having high-alignment orderliness can be implemented. Hereinafter, the content of the present invention will be described in detail with reference to examples.

Example 1

Figure 3:
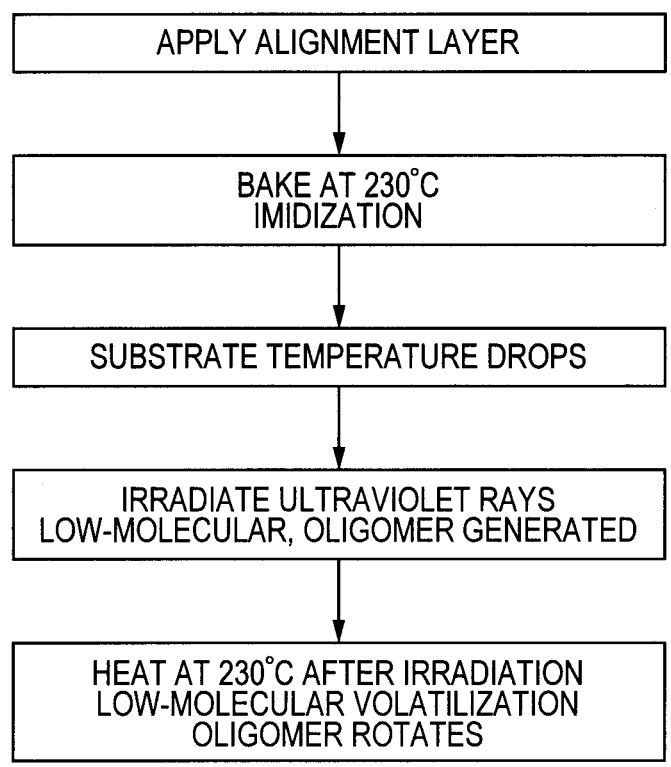
FIG. 3 is a process diagram illustrating a liquid process of an alignment film.

FIG. 3 is a diagram illustrating a process of forming an alignment film subjected to optical alignment processing. The process of FIG. 3 is common to the TFT substrate, and the opposed substrate. The alignment film is applied to the TFT substrate with the pixel electrode or the opposite substrate with the overcoat layer in FIG. 1. The alignment film may be applied by using a spin coating method, an inkjet method, a spray coating method, or a rod coating method.

The alignment film material contains an alignment material acquired by esterifying dehydrated condensate of material represented by (Chem. 1) (1,2-bis(4-aminophenyl)ethane when R1 and R2 are hydrogen and n=2) and material represented by (Chem. 3) (1,3-dimethyl cyclobutane tetracarboxylic acid dianhydride when R3 and R4 are methyl) as well as and an alignment material acquired by esterifying dehydrated condensate of represented by (Chem. 2) (paraphenyldiamine) and material represented by (Chem. 3) (1,3-dimethyl cyclobutane tetracarboxylic acid dianhydride when R3 and R4 are methyl) at a weight ratio of 1:1.

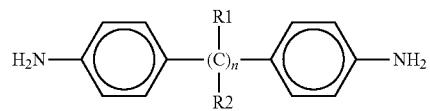

[Chem. 1]

[Chem. 2]

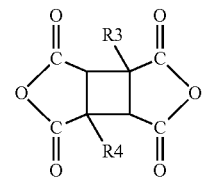

[Chem. 3]

The applied alignment film is baked at 230° C. to imidize the alignment film. In this case, the alignment material acquired by esterifying dehydrated condensate of material represented by (Chem. 2) (paraphenyldiamine) and material represented by (Chem. 3) (1,3-dimethyl cyclobutane tetracarboxylic acid dianhydride when R3 and R4 are methyl) has a rigid structure (hereinafter, referred to as the alignment film having the rigid structure), and the alignment material acquired by esterifying dehydrated condensate of material represented by (Chem. 1) (1,2-bis(4-aminophenyl)ethane when R1 and R2 are hydrogen and n=2) and material represented by (Chem. 3) (1,3-dimethyl cyclobutane tetracarboxylic acid dianhydride when R3 and R4 are methyl) has a flexible structure (hereinafter, referred to as the alignment film having the flexible structure).

Thereafter, the temperature of the substrate is brought down to approximately room temperature. Further, since the substrate is thin, the temperature of the substrate is brought down in a short time when the substrate is removed from a baking furnace. In this state, linearly polarized ultraviolet rays are irradiated to the alignment film for the optical alignment. Uniaxiality is given to the alignment film of the high molecules as main chains of the alignment film of the high molecules are cut in the polarization direction by the linearly polarized ultraviolet rays. In this case, a volatile low-molecular material or oligomer is generated by cutting a polymer. A polarization exposure apparatus in which a Deep-UV lamp (ultrahigh-voltage He—Xe) manufactured by Ushio and a polarizer are combined is used and the ultraviolet-rays are irradiated to the alignment film at 3 J/cm².

After the ultraviolet rays are irradiated, the substrate is heated at 230° C. to volatilize a volatile low-molecular material. In this case, nonvolatile oligomer on the alignment film having the rigid structure is immovable on the alignment film. Meanwhile, the nonvolatile oligomer on the alignment film having the flexible structure may rotate on the alignment film and improve alignment orderliness.

Figure 4:
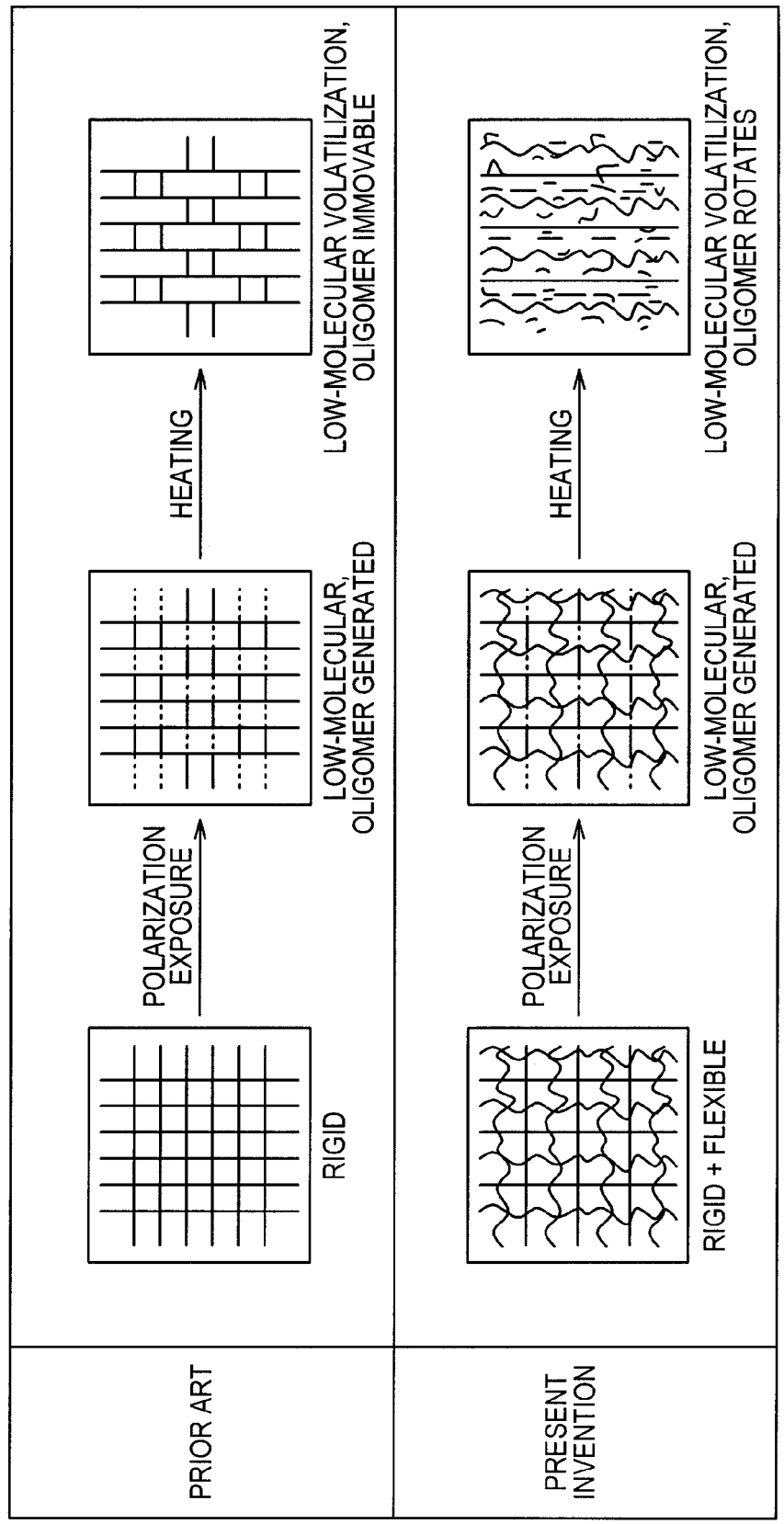
FIG. 4 is a mimetic diagram illustrating a film structure for each process in optical alignment processing in the related art and according to an embodiment of the present invention.

FIG. 4 is a mimetic diagram illustrating by comparing an alignment film structure in the related art with an alignment film structure in the present invention. The upper part is the structure in the related art and the lower part is the structure in the present invention. The material in the related art is formed only by the alignment film having the rigid structure, and the rigid structure and the flexible structure coexist in the material in the present invention. In FIG. 4, the alignment film materials are mixed by the weight ratio of 1:1 and applied onto a quartz substrate.

The left drawings of FIG. 4 are mimetic diagrams of the alignment film structure in which the alignment film is applied and heated at 230° C. for 10 minutes. In the related art, polyimide is regularly formed in a lattice shape and has the rigid structure. In this regard, in the present invention, the rigid structure in which polyimide is formed in the lattice shape and the flexible structure in which flexible polyimide crosses flexibly coexist.

Thereafter, a state of cooling the substrate up to approximately normal temperature and exposing the cooled substrate by using polarized ultraviolet rays is illustrated in a middle column of FIG. 4. In the middle drawings of FIG. 4, a main chain of polyimide is cut and the alignment orderliness of the alignment film is thus revealed in the direction of the polarization electric field vector of the ultraviolet rays by the polarized ultraviolet rays. The above structure is the same as the structure in the related art and the structure in the present invention.

Thereafter, a state in which the substrate is baked at 230° C. for approximately 10 minutes is illustrated in right drawings of FIG. 4. Since the related art is formed by only polyimide having the rigid structure, oligomer is immovable. Meanwhile, in the present invention, the rigid structure and the flexible structure coexist and both oligomer in the rigid structure and oligomer in the flexible structure rotate to thereby improve the alignment orderliness.

The above description will be summarized as follows. That is, in the structure in the related art shown in the upper part of FIG. 4, rigid polyimide having a large molecular extinction coefficient difference between the long-axis direction of the molecules and the short-axis direction of the molecules is used as the alignment film material to increase the alignment orderliness as much as possible. This is based on an idea that the alignment orderliness is increased by using a fact that a difference in density of polyimide in the E// direction and the E⊥ direction after irradiating the polarized ultraviolet rays increases as the molecular extinction coefficient difference increases because a photolysis speed of polyimide is in proportion to the molecular extinction coefficient of polyimide. Herein, E// is a component parallel to the electric field vector of polarization and E⊥ is a component vertical to the electric field vector of polarization.

However, polyimide having a large molecular extinction coefficient difference is generally a high molecule that has high molecular linearity and is rigid. As a result, since a molecular direction of a photolysis product is fixed in a direction of a photolysis production state in spite of heating after polarization exposure, the alignment orderliness is not increased.

Meanwhile, in the present invention shown in the lower part of FIG. 4, the alignment film material mixed with the flexible polyimide of which the main chain is cut by the polarized ultraviolet rays is used. Therefore, as shown in FIG. 5, a difference in density of the alignment molecules in the E// direction and the E⊥ direction can be increased and the alignment orderliness can be increased as compared with the alignment film independently using the respective alignment film materials.

Figure 5:
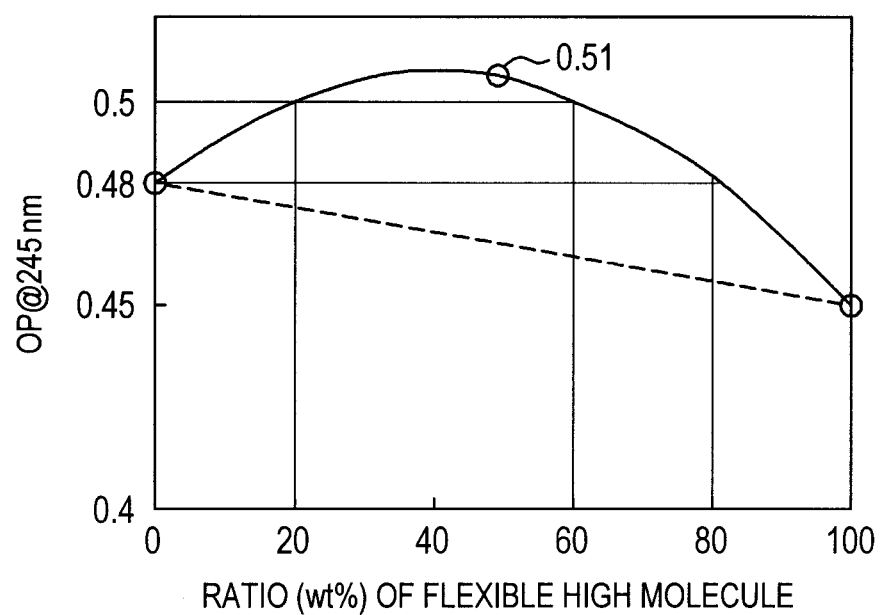
FIG. 5 is a graph illustrating a relationship between wt % of a flexible structure and an order parameter (OP) of an alignment film.

FIG. 5 illustrates a relationship between a mixture ratio and the alignment orderliness when the rigid polyimide and the flexible polyimide are mixed. As known from FIG. 5, the alignment orderliness in the case of using the alignment film material in which both polyimides are mixed is higher than the case of using the alignment film in which the individual alignment film materials are independently used.

In FIG. 5, a sample illustrated in FIG. 4 is measured as below. A spectrum of the polarized ultraviolet rays of a heated alignment film is measured, and a UV-absorbed two-color ratio (two-color ratio) which is an index of the alignment orderliness, that is, $(A\perp - A//)/(A\perp + A//)$ is acquired from absorptiveness. Herein, A// is absorptiveness of an alignment film in the E// direction and A⊥ is absorptiveness of the alignment film in the E⊥ direction. Further, when A is set as the absorptiveness, there is a relationship of $A = \epsilon C t$. $\epsilon$ represents the molecular extinct coefficient, C represents a density of a predetermined directional molecule of polyimide, and t represents the thickness of polyimide.

In FIG. 5, a vertical axis represents an order parameter (OP) in an ultraviolet ray having a wavelength of 245 nm and a horizontal axis represents wt % of the alignment film having the flexible structure on the alignment film. Further, the order parameter (OP) has the same meaning as the UV-absorbed two-color ratio. As seen from FIG. 5, a value of the OP when the ratio of the flexible structure is 50 wt % is 0.51. When an anchoring strength of liquid crystals by the alignment film at that time is measured, the anchoring strength is found to be 4.1 mJ/m$^2$.

As a comparative example, a measurement result of the OP by forming the alignment film in which only the alignment material having the rigid structure acquired by esterifying dehydrated condensate of paraphenyldiamine represented by (Chem. 2) and 1,3-dimethyl cyclobutane tetracarboxylic acid dianhydride represented by (Chem. 3) when R3 and R4 are methyl is used as the alignment film material is 0.48. Further, a measurement result of the OP by forming the alignment film in which only the alignment material having the flexible structure acquired by esterifying dehydrated condensate of 1,2-bis(4-aminophenyl)ethane represented by (Chem. 1) when R1 and R2 are hydrogen and n=2 and 1,3-dimethyl cyclobutane tetracarboxylic acid dianhydride represented by (Chem. 3) when R3 and R4 are methyl is used as the alignment film material is 0.44. That is, like the present invention, by mixing and using the alignment film materials having the flexible structure and the rigid structure, the OP, i.e., the UV-absorbed two-color ratio can be improved.

In FIG. 5, the alignment film material having the flexible structure is used in 20 to 60 wt %, such that the OP, that is, the UV-absorbed two-color ratio may be set to 0.5 or more. Further, the alignment film material having the flexible structure is used in 80% or less, such that the UV-absorbed two-color ratio may be more than 0.48 which is the OP when the flexible structure is zero. In this case, the material having the flexible structure is more than 0 wt % and equal to or less than 80 wt %.

As described above, according to the present invention, the order parameter (OP), that is, the UV-absorbed two-color ratio can be improved and the AC afterimage can be suppressed by improving the anchoring strength of the liquid crystals by the alignment film.

In the example as above, as the alignment film material having the flexible structure, the alignment material acquired by esterifying dehydrated condensate of material represented by (Chem. 1) (1,2-bis(4-aminophenyl)ethane when R1 and R2 are hydrogen and n=2) and material represented by (Chem. 3) (1,3-dimethyl cyclobutane tetracarboxylic acid dianhydride when R3 and R4 are methyl) is used. In addition, the alignment film material having the flexible structure may be configured by using the alignment material acquired by esterifying dehydrated condensate of material represented by (Chem. 4) (4,4'-Diaminodiphenyl ether) and a derivative thereof and material represented by (Chem. 3) (,3-dimethyl cyclobutane tetracarboxylic acid dianhydride when R3 and R4 are methyl).

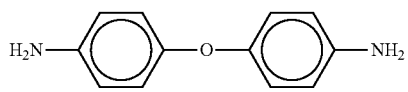

[Chem. 4]

Further, in the example as above, as the alignment film material having the rigid structure, the alignment material acquired by esterifying dehydrated condensate of material represented by (Chem. 2) (paraphenyldiamine) and material represented by (Chem. 3) (1,3-dimethyl cyclobutane tetracarboxylic acid dianhydride when R3 and R4 are methyl) is used. In addition, the alignment film material having the rigid structure may be configured by using the alignment material acquired by esterifying dehydrated condensate of a paraphenylene diamine derivative represented by (Chem. 5) and material represented by (Chem. 3) (1,3-dimethyl cyclobutane tetracarboxylic acid dianhydride when R3 and R4 are methyl). Further, condensate of 1,3-dimethyl cyclobutane tetracarboxylic acid dianhydride and diamine as well as an esterified product may also be appropriately used as the alignment material of the present invention.

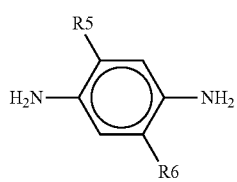

[Chem. 5]

What is claimed is:

1. A liquid crystal display device, comprising:
a TFT substrate where an alignment film is formed on a pixel having a pixel electrode and a TFT;
an opposed substrate opposed to the TFT substrate and where an alignment film is formed on a color filter; and
liquid crystals interposed between the alignment film of the TFT substrate and the alignment film of the opposed substrate,
wherein each of the alignment films is subjected to optical alignment processing, and
each of the alignment films uses:
a first alignment film material comprising a dehydrated condensate of 1,2-bis(4-aminophenyl)ethane and 1,3-dimethyl cyclobutane tetracarboxylic acid dianhydride or a first alignment film material acquired by esterifying the dehydrated condensate of 1,2-bis(4-aminophenyl)ethane and 1,3-dimethyl cyclobutane tetracarboxylic acid dianhydride, and
a second alignment film material comprising a dehydrated condensate of paraphenyldiamine and 1,3-dimethyl cyclobutane tetracarboxylic acid dianhydride or a second alignment film material acquired by esterifying the dehydrated condensate of paraphenyldiamine and 1,3-dimethyl cyclobutane tetracarboxylic acid dianhydride.

2. The liquid crystal display device according to claim 1, wherein the first alignment film material is more than 0 wt % and equal to or less than 80 wt % with respect to a total weight of the first alignment film material and the second alignment film material.

3. The liquid crystal display device according to claim 1, wherein the first alignment film material is 20 wt % or more or 60 wt % or less with respect to the total weight of the first alignment film material and the second alignment film material.

4. An alignment film material, wherein the alignment film material is a mixture of a first alignment film material comprising a dehydrated condensate of 1,2-bis(4-aminophenyl)ethane and 1,3-dimethyl cyclobutane tetracarboxylic acid dianhydride or a first alignment film material acquired by esterifying the dehydrated condensate of 1,2-bis(4-aminophenyl)ethane and 1,3-dimethyl cyclobutane tetracarboxylic acid dianhydride, and a second alignment film material comprising dehydrated condensate of paraphenyldiamine and 1,3-dimethyl cyclobutane tetracarboxylic acid dianhydride or a second alignment film material acquired by esterifying the dehydrated condensate of paraphenyldiamine and 1,3-dimethyl cyclobutane tetracarboxylic acid dianhydride.

5. The alignment film material according to claim 4, wherein the first alignment film material is more than 0 wt % and equal to or less than 80 wt % with respect to a total weight of the first alignment film material and the second alignment film material.

6. The alignment film material according to claim 4, wherein the first alignment film material is 20 wt % or more or 60 wt % or less with respect to the total weight of the first alignment film material and the second alignment film material.

7. The alignment film material according to claim 4, wherein the alignment film material is an optical alignment film material.

8. The alignment film material according to claim 5, wherein the alignment film material is an optical alignment film material.

9. The alignment film material according to claim 6, wherein the alignment film material is an optical alignment film material.

10. A liquid crystal display device, comprising:
a TFT substrate where an alignment film is formed on a pixel having a pixel electrode and a TFT;
an opposed substrate opposed to the TFT substrate and where an alignment film is formed on a color filter; and
liquid crystals interposed between the alignment film of the TFT substrate and the alignment film of the opposed substrate,
wherein the alignment films are subjected to optical alignment processing, and
each of the alignment films comprises:
a first alignment film material comprising a dehydrated condensate of 1,2-bis(4-aminophenyl)ethane and 1,3-dimethyl cyclobutane tetracarboxylic acid dianhydride or a first alignment film material acquired by esterifying the dehydrated condensate of 1,2-bis(4-aminophenyl)ethane and 1,3-dimethyl cyclobutane tetracarboxylic acid dianhydride, and
a second alignment film material comprising a dehydrated condensate of paraphenyldiamine and 1,3-dimethyl cyclobutane tetracarboxylic acid dianhydride or a second alignment film material acquired by esterifying the dehydrated condensate of paraphenyldiamine and 1,3-dimethyl cyclobutane tetracarboxylic acid dianhydride.

11. The liquid crystal display device according to claim 10, wherein the first alignment film material is more than 0 wt % and equal to or less than 80 wt % with respect to a total weight of the first alignment film material and the second alignment film material.

12. The liquid crystal display device according to claim 10, wherein the first alignment film material is 20 wt % or more or 60 wt % or less with respect to the total weight of the first alignment film material and the second alignment film material.

\* \* \* \* \*